(12) United States Patent
Reese

(10) Patent No.: US 7,269,878 B2
(45) Date of Patent: Sep. 18, 2007

(54) STEAM STOP FOR STEAM CLEANER

(75) Inventor: Chad A. Reese, Auburn, AL (US)

(73) Assignee: Euro Pro Operatin LLC, West Newton, MA (US)

( * ) Notice: Subject to any disclaimer, the term of this patent is extended or adjusted under 35 U.S.C. 154(b) by 588 days.

(21) Appl. No.: 10/734,097

(22) Filed: Dec. 11, 2003

(65) Prior Publication Data
US 2005/0125934 A1  Jun. 16, 2005

(51) Int. Cl.
*A47L 5/14* (2006.01)
*A47L 9/02* (2006.01)
*B08B 1/32* (2006.01)

(52) U.S. Cl. .................. 15/320; 239/587.1; 239/587.4

(58) Field of Classification Search .................. 15/320, 15/321, 344; 392/394, 400–405; 239/579, 239/587.1, 587.4
See application file for complete search history.

(56) References Cited

U.S. PATENT DOCUMENTS 2,337,077 A * 12/1943 Woodman .................. 38/77.7
2,487,434 A * 11/1949 Geiss et al. ............ 222/402.23
2,615,215 A * 10/1952 Stagner ....................... 422/105
2,949,243 A *  8/1960 Raehs et al. ................. 239/579
6,536,534 B1 *  3/2003 Sundholm ..................... 169/37
6,640,383 B2 * 11/2003 Tsen ............................ 15/321
2002/0144374 A1 * 10/2002 Tsen ............................ 15/321
2003/0056316 A1 *  3/2003 Rosa et al. ................... 15/320
2003/0208872 A1 * 11/2003 Tsen ............................ 15/321

* cited by examiner

*Primary Examiner*—Terrence R. Till
(74) *Attorney, Agent, or Firm*—Greenberg Traurig LLP; Michael I. Wolfson, Esq.; Sylvia Tan, Esq.

(57) ABSTRACT

A steam stop safety mechanism for a portable steam cleaner prevents discharge of steam at the cleaner nozzle when attaching and disconnecting attachments, even if the cleaner trigger is in a locked open position. The mechanism includes a steel pin that is displaced in an extended position against a shoulder in the nozzle to prevent pressurized steam from escaping the nozzle. Attachment couplings include a pin retractor plate with a central hub that pushes the pin away from the shoulder to allow the steam to flow through openings in the retractor plate and out a concentrator or attachment hose that has a trigger to release steam as desired.

10 Claims, 4 Drawing Sheets

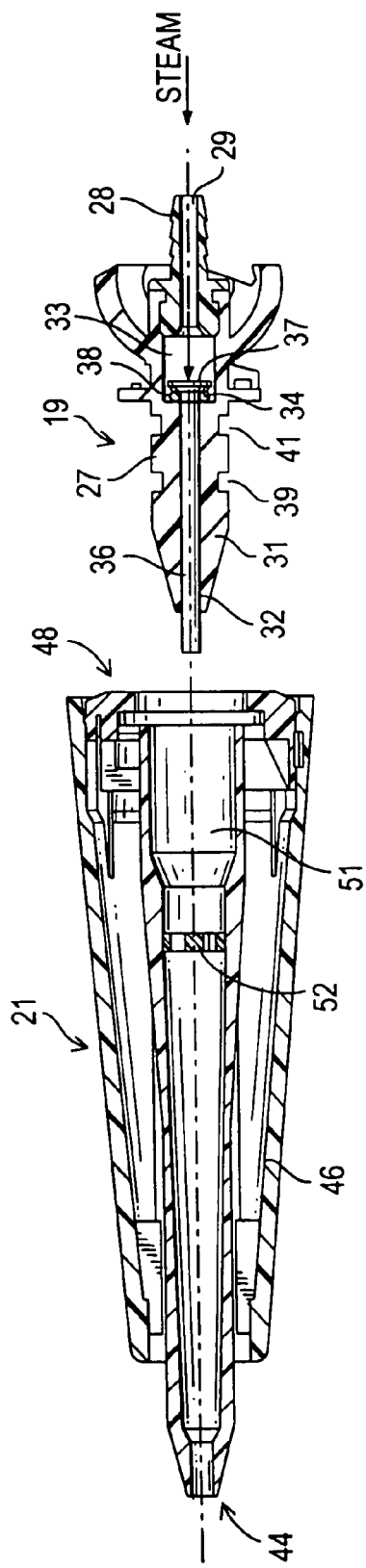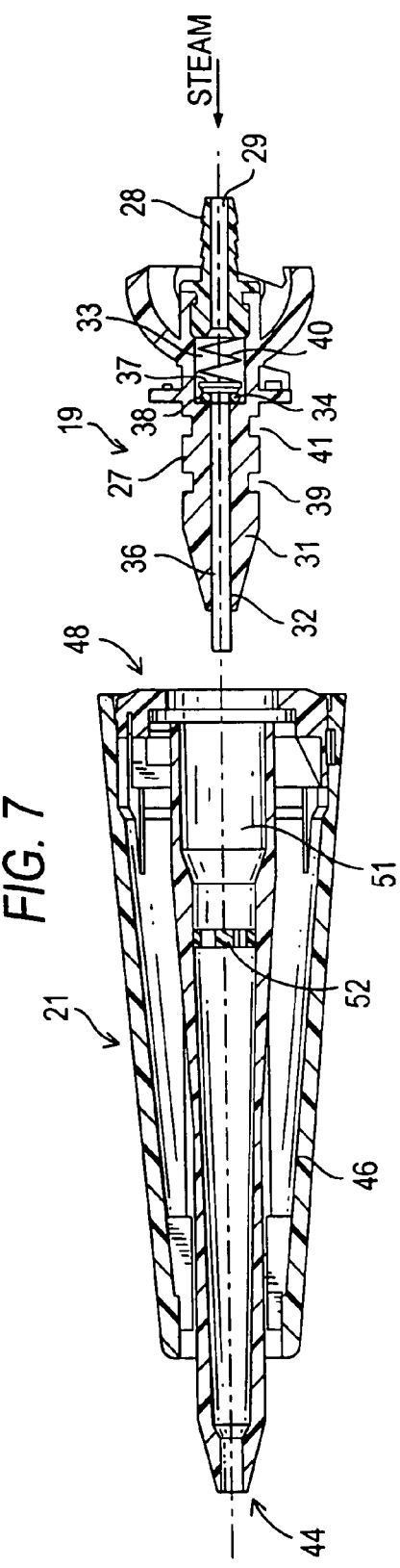

STEAM STOP FOR STEAM CLEANER

BACKGROUND OF THE INVENTION

The invention relates generally to devices for applying steam to objects, and more particularly to steam cleaner including a safety feature that prevents inadvertent release of steam when attaching or removing a hose, concentrator nozzle, or other accessory.

Steaming devices used to apply steam to household objects are well known. The uses of the devices vary widely, and may include the application of steam to drapes or other fabrics to ease wrinkles, and the application of steam to objects to assist in cleaning the objects.

Typical steam devices utilize a heating element to heat water. The heated water generates steam, which may be directed towards its intended destination through a nozzle which controls application of the steam. Variation of the shape and size of the nozzle allows for preferred distribution of generated steam to an object to be cleaned. The nozzles may typically be disconnectable from the steam generator to allow different nozzles to be utilized, based on the object to be steamed. The nozzle may be either closely coupled to the steam generator, or located at a distance from the steam generator, requiring tubing or other steam transfer structures to be interconnected between the steam generator and the discharge nozzle. Typically, it is beneficial to provide suitable connectors between the steam generator and the nozzle to allow either the nozzle to be connected to the steam generator, or to allow the interpositioning of transfer tubes or hoses between the steam generator and the nozzle.

Unregulated release of steam generated by a steam generator reduces the efficiency with which the device may be operated. Such inefficiency arises from the generation of steam when the steam is not being applied to an object to be steamed. This inefficiency increases the operating cost of the device, and decreases the utility of the device.

Manually operated steam release valves have been introduced between the steam generator and the discharge nozzle. However, such valves are often rendered inoperative by the user, such as by locking the steam release valve in an open position. A device to allow the operator to lock the discharge valve in an open position is often provided on the device, such that an operator would not need to retain manually the steam release valve in an open position during protracted periods of steaming.

Thus, notwithstanding the wide variety of steam generating appliances available, there exists the need to restrict flow of steam when a nozzle or steam hose is connected or disconnected from the device.

SUMMARY OF THE INVENTION

A steam stop safety mechanism for a steam generating device for applying steam to household objects is provided. The steam top mechanism prevents discharge of steam when connecting or removing concentrating nozzles or hoses, even if the trigger of the steam generator is in the locked open position. In one embodiment, the mechanism includes a stainless steel pin that is always in a first position in the steam boiler extended into the steam release nozzle blocking the exit of steam. This engagement occurs even if the user has the generator switch in the discharge position. When a hose, concentrator nozzle or accessory is attached, the pin is pushed back into the generator nozzle to allow the discharge of steam into the hose, concentrator or accessory.

Accordingly, it is an object of the invention to provide an improved steam stop mechanism for a hand held steam cleaner.

It is another object of the invention to provide an improved steam stop mechanism for a hand held steam cleaner that allows steam to escape from the boiler when a hose, concentrator or accessory is installed on the device.

It is a further object of the invention to provide an improved portable steam cleaner having a steam stop mechanism that prevents escape of steam when a hose, concentrator or accessory is not connected, even if the boiler trigger is in the open position.

A further object of the invention to provide an improved steam cleaner that prevents escape of steam when a hose is removed.

Still other objects and advantages of the invention will in part be obvious and will in part be apparent from the specification The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawing(s), in which:

FIG. 3 is an exploded elevational view in cross-section of a steam coupling including a nozzle and concentrator with steam stop mechanism in an closed position constructed and arranged in accordance with the invention;

FIG. 7 is an elevational view of the nozzle of FIG. 3 with a spring to bias the steam stop mechanism to the closed position in accordance with the invention.

DETAILED DESCRIPTION OF THE INVENTION

Figure 1:
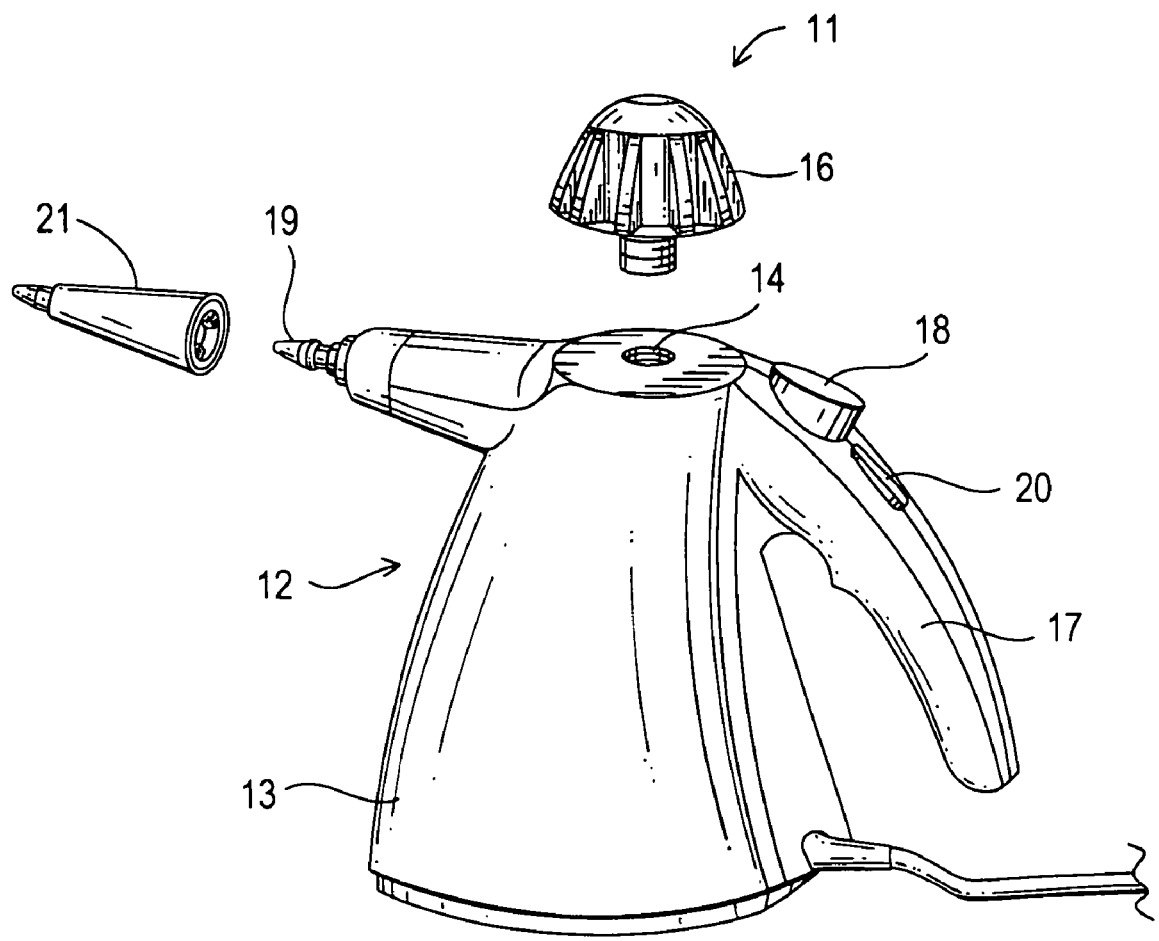
FIG. 1 is an elevational view of a portable steam cleaning device and concentrator nozzle constructed and arranged in accordance with to the invention.
Figure 2:
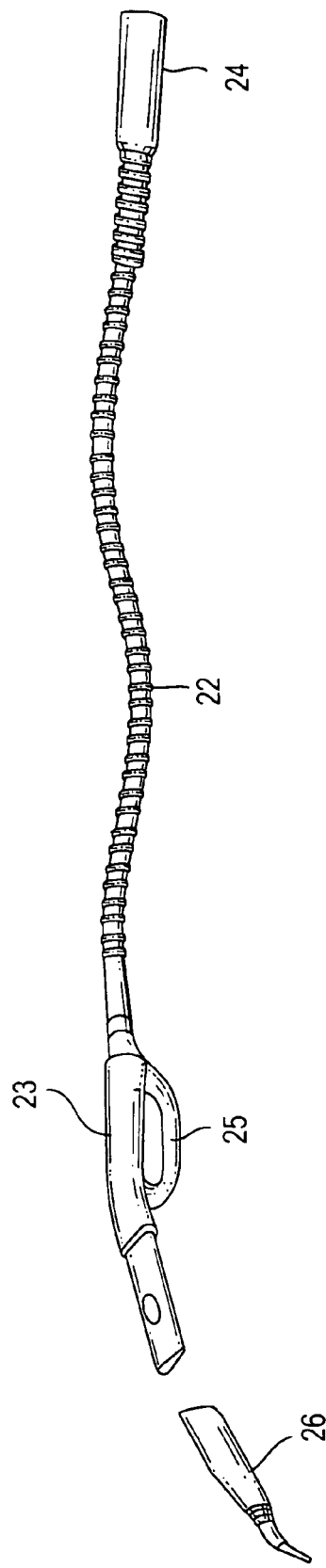
FIG. 2 is a plan view showing a steam connection hose and cleaning nozzle suitable for use with the cleaner of FIG. 1.
Figure 4:
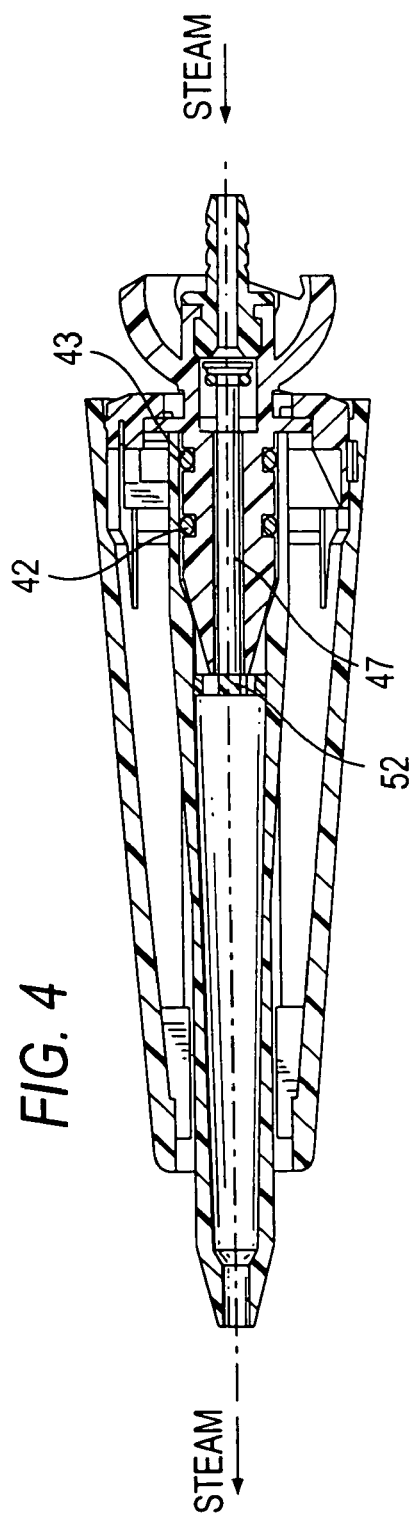
FIG. 4 is a cross-sectional view of the stop mechanism of FIG. 2 showing the concentrator coupled to the steam stop mechanism in an open condition.
Figure 6:
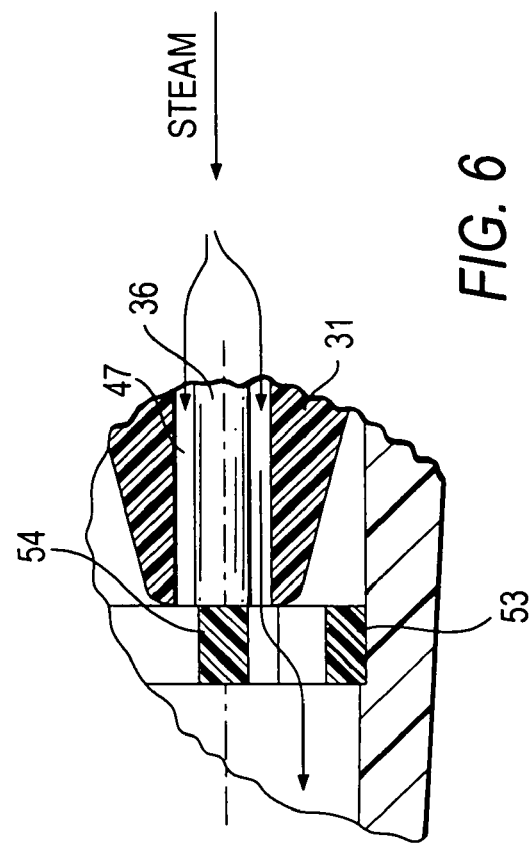
FIG. 6 is an enlarged view in cross-section of the steam flow path around pin and pin retractor when the concentrator is attached.

FIG. 1 is an elevational view of a steam device 11 having a main body 12 with a boiler 13 and a inlet 14 with locking cap 16. A handle 17 is mounted at the top of main body 12 and has a steam release trigger 18 and a trigger release 20 mounted thereon. A nozzle 19 is mounted on main body 12 opposite to handle 17. Steam is transferred from boiler 13 to a location at which discharge of the steam is desired through a concentrator 21 or a connection hose 22 with a trigger 23 show in FIG. 2. Hose 22 is coupled to nozzle 19 by a coupling 24 at its proximal end and has the same construction as concentrator 21 for coupling to nozzle 19. A handle 25 is on the distal end of hose 22. A cleaning nozzle 26 of a variety of types may be placed on handle 25 of hose 22 to control the pattern of discharge of steam. By using compatible couplings for connector 21 and hose 22, the steam stop mechanism prevents discharge of steam when connecting or removing concentrator 21 or hose 22, even if trigger 18 is in the locked open position.

Figure 5:
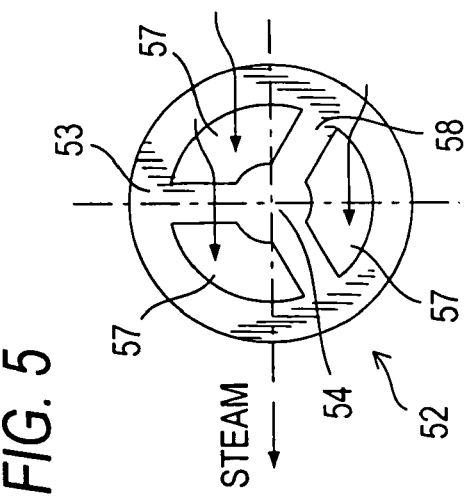
FIG. 5 is a plan view of the pin retractor of FIG. 5.

Nozzle 19 has an elongated body 27 with an inlet tube 28 at the proximal end and having an open lumen 29 extending to the distal end for discharge of with an inner bore 32. Nozzle body 27 includes a central cylindrical cavity 33 larger than inner bore 32 to form a shoulder 34 at the exit of central cylindrical cavity 33 and proximal end of inner bore 32. A cylindrical steel pin 36 having a head portion 37 is positioned in inner bore 32 forming an annular channel about pin 36 as shown in FIG. 5. An o-ring or gasket 38 is positioned at the shoulder side of pin head 37 to form a seal between cavity 33 and nozzle outlet tip 31 when steam pressure enters cavity 33 and extends pin 36 into nozzle lumen 32. Outlet tip 31 is formed with detents 39 and 41 for placement of o-rings 42 and 43 to form a seal with connector 21 or house 22. This connection with connector 21 is shown in FIG. 3 that will be described in more detail below.

Attached concentrator 21 shown in FIG. 3 has an elongated body 46 with a central lumen 47 extending from an inlet or proximal end 48 to a discharge or distal end 49. Proximal end 48 has a connector cavity 51 for coupling with nozzle 18 and forming a seal with o-rings 42 and 43 as shown in FIG. 3. Concentrator 21 also includes a pin retractor 52 at the distal end of cavity 51. When concentrator 21 is coupled to nozzle 18, pin retractor 52 displaces pin 36 towards boiler 13 thereby opening the seal formed by head 37 and shoulder 34 and allows pressurized steam in boiler 13 to escape and travel around pin 36 and be concentrated by concentrator 21 before exiting distal end 49.

Pin retractor 51 is a flat disk 53 with a central hub 54 held in position by a plurality of spokes 56. This forms an equal number of passages 57 for steam to pass and travel through concentrator lumen 47.

Hose 22 includes coupling 24 that is constructed in an identical manner to concentrator 21 with pin retractor 52 to displace pin 36 when attached to nozzle 19. When hose 22 is attached and released steam travels along the length of hose 22 to hose handle 25 with trigger 23. Accordingly, when hose 22 is attached and pin 36 is retracted, released steam is trapped in hose 22 and is not released to the atmosphere, even if main trigger 18 to boiler 13 is engaged. The same is true when hose coupling 24 is removed from nozzle 19. In this case, pin 36 is displaced to the extended position forming a seal against shoulder 34. This configuration prevents steam discharge at the nozzle when attaching and disconnecting attachments, even if the cleaner trigger is in a locked open position. FIG. 7 illustrates nozzle 19 with a spring 40 to bias pin 36 into nozzle lumen 32. This always places pin 36 in the closed safety position when concentrator 21 is not attached.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween The present invention may be embodied in other specific forms without departing from the spirit or essential attributes of the invention. Accordingly, reference should be made to the appended claims, rather than the foregoing specification, as indicating the scope of the invention.

What is claimed is:

1. A steam stop mechanism for a steam cleaner having a boiler with an inlet for water and an outlet for steam, comprising:

an elongated nozzle body having a central lumen of a first diameter along the nozzle body axis for connection to the boiler steam outlet;

the nozzle lumen formed with a cylindrical cavity at the proximal end having a diameter greater than that of the first diameter of the nozzle lumen to form a shoulder;

an elongated pin having a head portion with a diameter greater than the first diameter lumen diameter, the pin inserted into the cavity and lumen; and a gasket disposed between the head and shoulder;

wherein the pin is displaced into the lumen with the head against the shoulder due to steam pressure on the proximal face of the head to block the flow of steam into and through the nozzle lumen.

2. The steam stop mechanism of claim 1, including an elongated attachment having a coupling with a pin retractor cooperating to displace the pin to a retracted position and allow steam to pass around the pin and through the nozzle lumen when the accessory coupling is attached to the nozzle.

3. The steam stop mechanism of claim 2, wherein the pin retractor is a disk formed with a center hub and spoke to form open areas to allow steam to pass when the pin is retracted into the nozzle.

4. The steam stop mechanism of claim 2, wherein the attachment is a hose with a selectively agreeable trigger at the distal end to release steam as desired.

5. The steam stop mechanism of claim 1, further including a spring in the cylindrical cavity to bias the pin against the shoulder.

6. A steam cleaner including a steam stop safety mechanism to prevent steam discharge when attaching or removing attachments, comprising:

a main body including a boiler with heating elements and including a water inlet and corresponding cap and a handle mounted to the main body and a steam outlet with a nozzle connected to the outlet, the nozzle including a steam stop mechanism, including:

an elongated nozzle body having a central lumen of a first diameter along the nozzle body axis for connection to the boiler steam outlet;

the nozzle lumen formed with a cylindrical cavity at the proximal end having a diameter greater than that of the first diameter of the nozzle lumen to form a shoulder;

an elongated pin having a head portion with a diameter greater than the first diameter lumen diameter, the pin inserted into the cavity and lumen; and a gasket disposed between the head and shoulder;

wherein the pin is displaced into the lumen with the head against the shoulder due to steam pressure on the proximal face of the head to block the flow of steam into and through the nozzle lumen.

7. The steam stop mechanism of claim 6, including an elongated attachment having a coupling with a pin retractor cooperating to displace the pin to a retracted position and allow steam to pass around the pin and through the nozzle lumen when the accessory coupling is attached to the nozzle.

8. The steam cleaner of claim 7, wherein the pin retractor is a disk formed with a center hub and spoke to form open areas to allow steam to pass when the pin is retracted into the nozzle.

9. The steam cleaner of claim 7, wherein the attachment is a hose with a selectively agreeable trigger at the distal end to release steam as desired.

10. The steam stop of claim 6, further including a spring in the cylindrical cavity to bias the pin against the shoulder.

* * * * *

UNITED STATES PATENT AND TRADEMARK OFFICE
CERTIFICATE OF CORRECTION

PATENT NO.         : 7,269,878 B2                                   Page 1 of 1
APPLICATION NO. : 10/734097
DATED              : September 18, 2007
INVENTOR(S)        : Chad A. Reese It is certified that error appears in the above-identified patent and that said Letters Patent is hereby corrected as shown below:

On Title Page

Item

"(73) Assignee: Euro Pro Operatin LLC" should read

Item

--(73) Assignee: Euro-Pro Operating, LLC--

Signed and Sealed this

Fourth Day of December, 2007

JON W. DUDAS
*Director of the United States Patent and Trademark Office*